US008471852B1

(12) United States Patent
Bunnell (10) Patent No.: US 8,471,852 B1
(45) Date of Patent: Jun. 25, 2013

(54) METHOD AND SYSTEM FOR TESSELLATION OF SUBDIVISION SURFACES

(75) Inventor: Michael Todd Bunnell, Pleasanton, CA (US)

(73) Assignee: Nvidia Corporation, Santa Clara, CA (US)

(*) Notice: Subject to any disclaimer, the term of this patent is extended or adjusted under 35 U.S.C. 154(b) by 573 days.

(21) Appl. No.: 10/452,470

(22) Filed: May 30, 2003

(51) Int. Cl.
*G06T 15/30* (2006.01)
*G06T 17/20* (2006.01)

(52) U.S. Cl.
USPC .......................................................... 345/423

(58) Field of Classification Search
USPC .................................................. 345/423, 420
See application file for complete search history.

(56) References Cited

U.S. PATENT DOCUMENTS

| | | | |
|---|---|---|---|
| 3,904,818 A | 9/1975 | Kovac | |
| 4,253,120 A | 2/1981 | Levine | |
| 4,646,251 A * | 2/1987 | Hayes et al. | 345/423 |
| 4,685,071 A | 8/1987 | Lee | |
| 4,739,495 A | 4/1988 | Levine | |
| 4,771,470 A | 9/1988 | Geiser et al. | |
| 4,920,428 A | 4/1990 | Lin et al. | |
| 4,987,496 A | 1/1991 | Greivenkamp, Jr. | |
| 5,175,430 A | 12/1992 | Enke et al. | |
| 5,261,029 A * | 11/1993 | Abi-Ezzi et al. | 345/423 |
| 5,305,994 A | 4/1994 | Matsui et al. | |
| 5,387,983 A | 2/1995 | Sugiura et al. | |
| 5,475,430 A | 12/1995 | Hamada et al. | |
| 5,513,016 A | 4/1996 | Inoue | |
| 5,608,824 A | 3/1997 | Shimizu et al. | |
| 5,652,621 A | 7/1997 | Adams, Jr. et al. | |
| 5,793,433 A | 8/1998 | Kim et al. | |
| 5,878,174 A | 3/1999 | Stewart et al. | |
| 5,903,273 A * | 5/1999 | Mochizuki et al. | 345/423 |
| 5,905,530 A | 5/1999 | Yokota et al. | |
| 5,995,109 A * | 11/1999 | Goel et al. | 345/423 |
| 6,016,474 A | 1/2000 | Kim et al. | |
| 6,078,331 A * | 6/2000 | Pulli et al. | 345/423 |
| 6,111,988 A | 8/2000 | Horowitz et al. | |
| 6,118,547 A | 9/2000 | Tanioka | |
| 6,141,740 A | 10/2000 | Mahalingaiah et al. | |
| 6,151,457 A | 11/2000 | Kawamoto | |
| 6,175,430 B1 | 1/2001 | Ito | |
| 6,252,611 B1 | 6/2001 | Kondo | |
| 6,256,038 B1 | 7/2001 | Krishnamurthy | |
| 6,281,931 B1 | 8/2001 | Tsao et al. | |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

Loop, C., DeRose, T., Generalized B-Spline Surfaces of Arbitrary Topology, Aug. 1990, SIGRAPH 90, pp. 347-356.*

(Continued)

*Primary Examiner* — Said Broome (57) ABSTRACT

A method and system for performing adaptive tessellation of a subdivision surface. The method includes the step of accessing a model of a surface for subdivision processing. The model is converted to an intermediate form to facilitate subdivision processing. The intermediate form of the model is then tessellated.

34 Claims, 7 Drawing Sheets

U.S. PATENT DOCUMENTS

| | | |
|---|---|---|
| 6,289,103 B1 | 9/2001 | Sako et al. |
| 6,314,493 B1 | 11/2001 | Luick |
| 6,319,682 B1 | 11/2001 | Hochman |
| 6,323,934 B1 | 11/2001 | Enomoto |
| 6,392,216 B1 | 5/2002 | Peng-Tan |
| 6,396,397 B1 | 5/2002 | Bos et al. |
| 6,438,664 B1 | 8/2002 | McGrath et al. |
| 6,486,971 B1 | 11/2002 | Kawamoto |
| 6,504,952 B1 | 1/2003 | Takemura et al. |
| 6,584,202 B1 | 6/2003 | Montag et al. |
| 6,594,388 B1 | 7/2003 | Gindele et al. |
| 6,683,643 B1 | 1/2004 | Takayama et al. |
| 6,707,452 B1 * | 3/2004 | Veach ............................ 345/423 |
| 6,724,932 B1 | 4/2004 | Ito |
| 6,737,625 B2 | 5/2004 | Baharav et al. |
| 6,760,080 B1 | 7/2004 | Moddel et al. |
| 6,785,814 B1 | 8/2004 | Usami et al. |
| 6,806,452 B2 | 10/2004 | Bos et al. |
| 6,839,062 B2 | 1/2005 | Aronson et al. |
| 6,856,441 B2 | 2/2005 | Zhang et al. |
| 6,891,543 B2 | 5/2005 | Wyatt |
| 6,900,836 B2 | 5/2005 | Hamilton, Jr. |
| 6,950,099 B2 * | 9/2005 | Stollnitz et al. ............... 345/423 |
| 7,009,639 B1 | 3/2006 | Une et al. |
| 7,015,909 B1 | 3/2006 | Morgan III et al. |
| 7,023,479 B2 | 4/2006 | Hiramatsu et al. |
| 7,088,388 B2 | 8/2006 | MacLean et al. |
| 7,092,018 B1 | 8/2006 | Watanabe |
| 7,106,368 B2 | 9/2006 | Daiku et al. |
| 7,133,041 B2 | 11/2006 | Kaufman et al. |
| 7,133,072 B2 | 11/2006 | Harada |
| 7,146,041 B2 | 12/2006 | Takahashi |
| 7,221,779 B2 | 5/2007 | Kawakami et al. |
| 7,227,586 B2 | 6/2007 | Finlayson et al. |
| 7,245,319 B1 | 7/2007 | Enomoto |
| 7,305,148 B2 | 12/2007 | Spampinato et al. |
| 7,343,040 B2 | 3/2008 | Chanas et al. |
| 7,486,844 B2 | 2/2009 | Chang et al. |
| 7,502,505 B2 | 3/2009 | Malvar et al. |
| 7,580,070 B2 | 8/2009 | Yanof et al. |
| 7,627,193 B2 | 12/2009 | Alon et al. |
| 7,671,910 B2 | 3/2010 | Lee |
| 7,728,880 B2 | 6/2010 | Hung et al. |
| 7,750,956 B2 | 7/2010 | Wloka |
| 7,912,279 B2 | 3/2011 | Hsu et al. |
| 8,049,789 B2 | 11/2011 | Innocent |
| 2001/0001234 A1 | 5/2001 | Addy et al. |
| 2001/0012113 A1 | 8/2001 | Yoshizawa et al. |
| 2001/0012127 A1 | 8/2001 | Fukuda et al. |
| 2001/0015821 A1 | 8/2001 | Namizuka et al. |
| 2001/0019429 A1 | 9/2001 | Oteki et al. |
| 2001/0021278 A1 | 9/2001 | Fukuda et al. |
| 2001/0033410 A1 | 10/2001 | Helsel et al. |
| 2001/0050778 A1 | 12/2001 | Fukuda et al. |
| 2001/0054126 A1 | 12/2001 | Fukuda et al. |
| 2002/0012131 A1 | 1/2002 | Oteki et al. |
| 2002/0015111 A1 | 2/2002 | Harada |
| 2002/0018244 A1 | 2/2002 | Namizuka et al. |
| 2002/0027670 A1 | 3/2002 | Takahashi et al. |
| 2002/0033887 A1 | 3/2002 | Hieda et al. |
| 2002/0041383 A1 | 4/2002 | Lewis, Jr. et al. |
| 2002/0044778 A1 | 4/2002 | Suzuki |
| 2002/0054374 A1 | 5/2002 | Inoue et al. |
| 2002/0063802 A1 | 5/2002 | Gullichsen et al. |
| 2002/0105579 A1 | 8/2002 | Levine et al. |
| 2002/0126210 A1 | 9/2002 | Shinohara et al. |
| 2002/0146136 A1 | 10/2002 | Carter, Jr. |
| 2002/0149683 A1 | 10/2002 | Post |
| 2002/0158971 A1 | 10/2002 | Daiku et al. |
| 2002/0167202 A1 | 11/2002 | Pfalzgraf |
| 2002/0167602 A1 | 11/2002 | Nguyen |
| 2002/0191694 A1 | 12/2002 | Ohyama et al. |
| 2002/0196470 A1 | 12/2002 | Kawamoto et al. |
| 2003/0035100 A1 | 2/2003 | Dimsdale et al. |
| 2003/0067461 A1 * | 4/2003 | Fletcher et al. ............... 345/420 |
| 2003/0122825 A1 | 7/2003 | Kawamoto |
| 2003/0142222 A1 | 7/2003 | Hordley |
| 2003/0146975 A1 | 8/2003 | Joung et al. |
| 2003/0169353 A1 | 9/2003 | Keshet et al. |
| 2003/0169918 A1 | 9/2003 | Sogawa |
| 2003/0197701 A1 * | 10/2003 | Teodosiadis et al. ......... 345/420 |
| 2003/0222995 A1 | 12/2003 | Kaplinsky et al. |
| 2003/0223007 A1 | 12/2003 | Takane |
| 2004/0001061 A1 * | 1/2004 | Stollnitz et al. ............... 345/423 |
| 2004/0001234 A1 | 1/2004 | Curry et al. |
| 2004/0032516 A1 | 2/2004 | Kakarala |
| 2004/0066970 A1 | 4/2004 | Matsugu |
| 2004/0100588 A1 | 5/2004 | Hartson et al. |
| 2004/0101313 A1 | 5/2004 | Akiyama |
| 2004/0109069 A1 | 6/2004 | Kaplinsky et al. |
| 2004/0189875 A1 | 9/2004 | Zhai et al. |
| 2004/0218071 A1 | 11/2004 | Chauville et al. |
| 2004/0247196 A1 | 12/2004 | Chanas et al. |
| 2005/0007378 A1 | 1/2005 | Grove |
| 2005/0007477 A1 | 1/2005 | Ahiska |
| 2005/0030395 A1 | 2/2005 | Hattori |
| 2005/0046704 A1 | 3/2005 | Kinoshita |
| 2005/0099418 A1 | 5/2005 | Cabral et al. |
| 2005/0185058 A1 | 8/2005 | Sablak |
| 2005/0238225 A1 | 10/2005 | Jo et al. |
| 2005/0243181 A1 | 11/2005 | Castello et al. |
| 2005/0248671 A1 | 11/2005 | Schweng |
| 2005/0261849 A1 | 11/2005 | Kochi et al. |
| 2005/0286097 A1 | 12/2005 | Hung et al. |
| 2006/0050158 A1 | 3/2006 | Irie |
| 2006/0061658 A1 | 3/2006 | Faulkner et al. |
| 2006/0087509 A1 | 4/2006 | Ebert et al. |
| 2006/0133697 A1 | 6/2006 | Uvarov et al. |
| 2006/0176375 A1 | 8/2006 | Hwang et al. |
| 2006/0197664 A1 | 9/2006 | Zhang et al. |
| 2006/0274171 A1 | 12/2006 | Wang |
| 2006/0290794 A1 | 12/2006 | Bergman et al. |
| 2006/0293089 A1 | 12/2006 | Herberger et al. |
| 2007/0091188 A1 | 4/2007 | Chen et al. |
| 2007/0147706 A1 | 6/2007 | Sasaki et al. |
| 2007/0171288 A1 | 7/2007 | Inoue et al. |
| 2007/0236770 A1 | 10/2007 | Doherty et al. |
| 2007/0247532 A1 | 10/2007 | Sasaki |
| 2007/0285530 A1 | 12/2007 | Kim et al. |
| 2008/0030587 A1 | 2/2008 | Helbing |
| 2008/0062164 A1 | 3/2008 | Bassi et al. |
| 2008/0101690 A1 | 5/2008 | Hsu et al. |
| 2008/0143844 A1 | 6/2008 | Innocent |
| 2009/0010539 A1 | 1/2009 | Guarnera et al. |
| 2009/0116750 A1 | 5/2009 | Lee et al. |
| 2009/0160957 A1 | 6/2009 | Deng et al. |
| 2009/0257677 A1 | 10/2009 | Cabral et al. |
| 2010/0266201 A1 | 10/2010 | Cabral et al. |

FOREIGN PATENT DOCUMENTS

| | | |
|---|---|---|
| EP | 1378790 | 7/2004 |
| EP | 1447977 | 8/2004 |
| EP | 1550980 | 7/2005 |
| GB | 2045026 | 10/1990 |
| GB | 2363018 | 12/2001 |
| JP | 61187467 | 8/1986 |
| JP | 62-151978 | 7/1987 |
| JP | 07-015631 | 1/1995 |
| JP | 8036640 | 2/1996 |
| JP | 08-079622 | 3/1996 |
| JP | 2001-052194 | 2/2001 |
| JP | 2002-207242 | 7/2002 |
| JP | 2003-085542 | 3/2003 |
| JP | 2004-221838 | 8/2004 |
| JP | 2005094048 | 4/2005 |
| JP | 2005-182785 | 7/2005 |
| JP | 2005520442 | 7/2005 |
| JP | 2006025005 | 1/2006 |
| JP | 2006086822 | 3/2006 |
| JP | 2006-094494 | 4/2006 |
| JP | 2006121612 A2 | 5/2006 |
| JP | 2006134157 A2 | 5/2006 |
| JP | 2007019959 | 1/2007 |
| JP | 2007-148500 | 6/2007 |
| JP | 2007-233833 | 9/2007 |
| JP | 2007282158 | 10/2007 |
| JP | 2008-085388 | 4/2008 |

| | | |
|---|---|---|
| JP | 2008-277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | 2007056459 | 5/2007 |
| WO | 2007093864 | 8/2007 |

OTHER PUBLICATIONS

Davis, J., Marschner, S., Garr, M., Levoy, M., Filling Holes in Complex Surfaces Using Volumetric Diffusion, Dec. 2001, Stanford Univeristy, pp. 1-9.*

Takeuchi, S., Kanai, T., Suzuki, H., Shimada, K., Kimura, F., Subdivision Surface Fitting with QEM-based Mesh Simplification and Reconstruction of Approximated B-spline Surfaces, 2000, Eighth Pacific Conference on Computer Graphics and Applications, pp. 202-212.*

Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics Workshop, pp. 1-10.*

Kumar, S., Manocha, D., Interactive Display of Large Scale Trimmed NURBS Models, 1994, University of North Carolina at Chapel Hill, Technical Report, pp. 1-36.*

E. Catmull, J. Clark; "Recursively Generated B-Spline Surfaces on Arbitrary Topological Meshes"; Nov. 1978; Computer Aided Design; vol. 10; pp. 350-355.

J. Stam; "Exact Evaluation of Catmull-Clark Subdivision Surfaces at Arbitrary Parameter Values"; Jul. 1998; Computer Graphics; vol. 32; pp. 395-404.

J. Bolz, P. Schroder; "Rapid Evaluation of Catmull-Clark Subdivision Surfaces"; Web 3D '02.

DeRose, M. Kass, T. Truong; "Subdivision Surfaces in Character Animation"; Jul 1998; Computer Graphics and Interactive Techniques, Proc; pp. 85-94.

M. Halstead, M. Kass, T. DeRose; "Efficient, Fair Interpolation Using Catmull-Clark Surfaces"; Sep. 1993; Computer Graphics and Interactive Techniques, Proc; pp. 35-44.

D.W. H. Doo; "A Subdivision Algorithm for Smoothing Down Irregular Shaped Polyhedrons"; 1978; Interactive Techniques in Computer Aided Design; pp. 157-165.

D. Doo, M. Sabin; "Behaviour of Recursive Division Surfaces Near Extraordinary Points"; Sep. 1978; Computer Aided Design; vol. 10; pp. 356-360.

"A Pipelined Architecture for Real-Time Correction of Barrel Distortion in Wide-Angle Camera Images", Hau, T. Ngo, Student Member, IEEE and Vijayan K. Asari, Senior Member IEEE, IEEE transaction on Circuits and Systems for Video Technology: vol. 15 No. 3 Mar. 2005 pp. 436-444.

"Calibration and removal of lateral chromatic abberation in images," Mallon, et al., Science Direct, Copyright 2006, 11 pages.

"Method of Color Interpolation in a Single Color Camera Using Green Channel Separation," Weerasighe, et al., Visual Information Processing Lab, Motorola Austrailian Research Center, pp. IV-3233-IV3236, 2002.

http://slashdot.org/article/07/09/06/1431217.html http://englishrussia.com/?p=1377.

Kuno et al., "New Interpolation Method Using Discriminated Color Correlation for Digital Still Cameras," IEEE transac. On Consumer Electronics, vol. 45, No. 1, Feb. 1999, pp. 259-267.

Donald D. Spencer, "Illustrated Computer Graphics Dictionary", 1993, Camelot Publishing Company, p. 272.

Duca et ;al., "A Relational Debugging Engine for Graphics Pipeline, International Conference on Computer Graphics and Interactive Techniques", ACM SIGGRAPH Jul. 2005, pp. 453-463.

gDEBugger, graphicRemedy, http://www.gremedy.com Aug.8, 2006, pp. 1-18.

http://en.wikipedia.org/wiki/Bayer_filter; "Bayer Filter"; Wikipedia, the free encyclopedia; pp. 1-4 Nov. 2005.

http://en.wikipedia.org/wiki/Color_$_{filter\_}$array; "Color Filter Array"; Wikipedia, the free encyclopedia; pp. 1-5 Nov. 2005.

http://en.wikipedia.org/wiki/Color_space; "Color Space"; Wikipedia, the free encyclopedia; pp. 1-4 Sep. 2001.

http://en.wikipedia.org/wiki/Color_translation; "Color Management"; Wikipedia, the free encyclopedia; pp. 1-4 Feb. 2003.

http://en.wikipedia.org/wiki/Demosaicing; "Demosaicing"; Wikipedia, the free encyclopedia; pp. 1-5 Nov. 2005.

http://en.wikipedia.org/wiki/Half_tone; "Halftone"; Wikipedia, the free encyclopedia; pp. 1-5 Jul. 2002.

http://en.wikipedia.org/wiki/L*a*b*; "Lab Color Space"; Wikipedia, the free encyclopedia; pp. 1-4 Nov. 2003.

Keith R. Slavin; Application As Filed entitled "Efficient Method for Reducing Noise and Blur in a Composite Still Image From a Rolling Shutter Camera"; U.S. Appl. No. 12/069,669; Filed Feb. 11, 2008.

Ko at al., "Fast Digital Image Stabilizer Based on Gray-Code Bit-Plane Matching", IEEE Transactions on Consumer Electronics, vol. 45, No. 3, pp. 598-603, Aug. 1999.

Ko,et al., "Digital Image Stabilizing Algorithms Basd on Bit-Plane Matching", IEEE Transactions on Consumer Electronics, vol. 44, No. 3, pp. 617-622, Aug. 1988.

Morimoto et al., "Fast Electronic Digital Image Stabilization for Off-Road Navigation", Computer Vision Laboratory, Center for Automated Research University of Maryland. Real-Time Imaging, vol. 2, pp. 285-296, 1996.

Paik et al , "An Adaptive Motion Decision system for Digital Image Stabilizer Based on Edge Pattern Matching" IEEE Transactions on Consumer Electronics, vol. 38, No. 3, pp. 607-616, Aug. 1992.

Parhami. Computer Arithmetic, Oxford University Press, Jun. 2000, pp. 413-418.

S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.

S. Erturk; "Real-Time Digital Image Stabilization Using Kalman Filters", http://www.ideallibrary.com. Real-Time Imaging 8, pp. 317-328, 2002.

Uomori et al., "Automatic Image Stabilizing System by Full-Digital Signal Processing" vol. 36, No. 3, pp. 510-519, Aug. 1990.

Uomori et al., "Electronic Image Stabiliztion System for Video Cameras and VCRS" J. Soc. Motion Pict. Telev. Eng., vol. 101, pp. 66-75, 1992.

Weerasinghe of al.; "Method of Color Interpolation in a Single Sensor Color Camera Using Green Channel Separation"; Visual Information Proessing lab, Motorola Australian Research Center; IV 32333-IV3236 May 2002.

* cited by examiner

METHOD AND SYSTEM FOR TESSELLATION OF SUBDIVISION SURFACES

FIELD OF THE INVENTION

The field of the present invention pertains to computer implemented graphics. More particularly, the present invention relates to a system and method for rendering subdivision surfaces in a three dimensional graphics environment.

BACKGROUND OF THE INVENTION

Three dimensional (3D) computer graphics have also become a key technology for communicating ideas, data, and trends in most areas of commerce, science, and education. The objects in a 3-D computer generated image are typically described by data models. These models store descriptions of "primitives" (usually mathematically described polygons and polyhedra) that define the shape of the object, the object attributes, and the connectivity and positioning data describing how the objects fit together.

Many applications require models that enable the generation of smooth surfaces and smooth curves. To realistically generate a real-world image, the surfaces of objects, both the curved and flat surfaces, in the image need to be realistically modeled. The most common representations for 3D surfaces are "polygon meshes." A polygon mesh is a set of connected, polygonally bounded, planar surfaces. Open boxes, cabinets, and building exteriors can be easily and naturally represented by polygon meshes. Polygon meshes, however, are less easily used to represent objects with curved surfaces.

With a curved surface, a polygon mesh provides a modeled approximation of the true contour of the surface. Although the representation is only approximate, the "errors" of the approximation can be made arbitrarily small by using more and more polygons to create an increasingly accurate piece wise linear approximation. Generally, increasing the number of polygons in a given curved surface representation leads to a less "blocky," or geometrically aliased, representation of the real surface.

Computer graphics engineers rely upon a technique known as surface subdivision to provide a method of increasing the number of polygons comprising a polygon mesh. The use of subdivision surfaces however causes a number of problems. Subdividing a polygon mesh representation of an object causes an exponential increase in the number of polygons within the representation. This correspondingly causes a proportional increase in the resource requirements and performance demands placed upon the graphics computer system.

There are several published prior art methods for tessellating subdivision surfaces. Such methods include:

"Recursively generated B-spline surfaces on arbitrary topological surfaces" by E. Catmull and J. Clark (Computer-Aided Design, 10(6) pp. 350-355, November 1978);

"Exact Evaluation of Catmull-Clark Subdivision Surfaces at Arbitrary Parameter Values" by Jos Stam (Computer Graphics, 32 pp. 395-404, July 1998);

"Rapid Evaluation of Catmull-Clark Subdivision Surfaces" by Jeffery Bolz and Peter Shroder (Web 3D'02, Feb. 24-28, 2002, Tempe, Ariz., USA);

"Subdivision Surfaces in Character Animation", by Tony DeRose, Michael Kass, Tien Truong (Proceedings of the 25th Annual Conference on Computer Graphics and Interactive Techniques, pp. 85-94, July 1998);

"Efficient, fair interpolation using Catmull-Clark surfaces" by Mark Halstead, Michael Kass, Tony DeRose (Proceedings of the 20th Annual Conference on Computer Graphics and Interactive Techniques, pp. 35-44, September 1993);

"A Subdivision Algorithm for Smoothing Down Irregularly Shaped Polyhedrons" by Doo, D. (Proceedings of the International Conference on Interactive Techniques in Computer Aided Design, pp. 157-165, 1978, Bologna, Italy, IEEE Computer Society); and "Behaviour of Recursive Division Surfaces Near Extraordinary Points" by Doo, D. and Sabin, M. (Computer Aided Design, 10 pp. 356-360, September 1978).

Although the above prior art subdivision algorithms address, to some degree, problems with respect to the resource requirements of subdivision surfaces and problems with respect to the accurate representation of arbitrary topologies, they are each still inefficient in terms of the computational resources required for their execution, in both processor cycles and memory storage space. For example, prior art subdivision algorithms based on Catmull-Clark and Doo-Sabin provided a compact, easy-to-model representation of curved surfaces of arbitrary topology, however, rendering algorithms based on their subdivision rules are very inefficient in terms of memory space and computational time.

Surfaces based on Bezier patches have been widely used by some prior art algorithms due to the fact that Bezier patches are computationally less demanding to render. Bezier surface patches are defined by an array of control points (e.g., typically 4×4) in 3-D space that parametrically define the surface of the patch. Although the array of control points allows individual points on the surface to be computed quickly, objects having complex curves require many separate patches to model correctly, with each of these patches having their respective array of control points. This makes surfaces based on Bezier patches difficult to model with directly, since their representation is very space inefficient and they cannot be used to smoothly render arbitrary topologies.

One prior art scheme for dealing with the above resource requirement and accurate modeling problems involves the adaptation of the subdivision process to more effectively handle problematic areas of a model. This scheme is generally referred to as adaptive tessellation, where certain surfaces having curves and/or complex topology is subdivided to greater degree than the flatter surfaces of the model (e.g., areas which can be accurately represented with fewer numbers of polygons). While certain prior art applications support adaptive tessellation (e.g., PRman® from Pixar Corp.), such applications are not integrated with the graphics industry's major 3-D modeling/animation packages. Additionally, such prior art applications do not support interactive adaptive tessellation, where, for example, a graphics engineer can iteratively process a model to obtain the optimal degree of subdivision.

Another problem with prior art adaptive tessellation applications (e.g., PRman, etc.) is that they generally cannot guarantee "watertight" tessellation. As known by those skilled in the art, a typical prior art adaptive tessellation application can subdivide certain surfaces of a model in such manner as to create small gaps between adjacent polygons. This could have an extremely adverse impact on the quality of the final rendered model. To ensure a watertight tessellation (e.g., no gaps or cracks between the polygons), prior art adaptive tessellation applications must be followed by a time-consuming post-processing step involving the use of a specialized crack-avoidance algorithm. This algorithm is configured to examine an earlier subdivided model for any gaps and "glue" the problematic polygons together if necessary.

Thus, what is required is a solution for efficiently implementing surface subdivision in a polygon mesh. The required solution should be able to accurately subdivide a curved surface having an arbitrary topology using a minimum amount of memory. The required solution should support interactive processing in order to obtain a desired degree of subdivision. What is further required is system for efficiently computing a subdivision surface with respect to computational hardware requirements. The present invention provides a solution for the above requirements.

SUMMARY OF THE INVENTION

Embodiments of the present invention provide a method and system for performing adaptive tessellation on a subdivision surface. In one embodiment, the present invention comprises a computer implemented method for performing adaptive tessellation on a subdivision surface. The computer implemented method includes the step of accessing a model of a surface for subdivision processing. The model is converted to an intermediate form to facilitate more efficient handling and processing. The intermediate form of the model is then tessellated. Depending upon the requirements of a particular application, the intermediate form of the model can be tessellated into a plurality of quadrilateral polygons, or alternatively, the intermediate form of the model can be tessellated into a plurality of the triangle polygons.

In one embodiment, the model is converted to the intermediate form, wherein the intermediate form is a Bezier patch form configured to facilitate subdivision processing. In another embodiment, the intermediate form is a B-spline patch form. The model can be converted to the intermediate form from, for example, a Catmull-Clark form or from a Doo-Sabin form.

BRIEF DESCRIPTION OF THE DRAWINGS

The present invention is illustrated by way of example, and not by way of limitation, in the Figures of the accompanying drawings and in which like reference numerals refer to similar elements and in which.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a method and system for performing adaptive tessellation of a subdivision surface. Embodiments of the present invention provide a solution that efficiently implements surface subdivision in a 3-D object model. Embodiments of the present invention are able to accurately subdivide a curved surface having an arbitrary topology using a minimum amount of memory. Additionally, embodiments of the present invention are able to efficiently compute a subdivision surface without imposing extreme computational hardware requirements on a computer system platform. Embodiments of the present invention and their benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "tessellating" or "accessing" or "processing" or "subdividing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform

Figure 1:
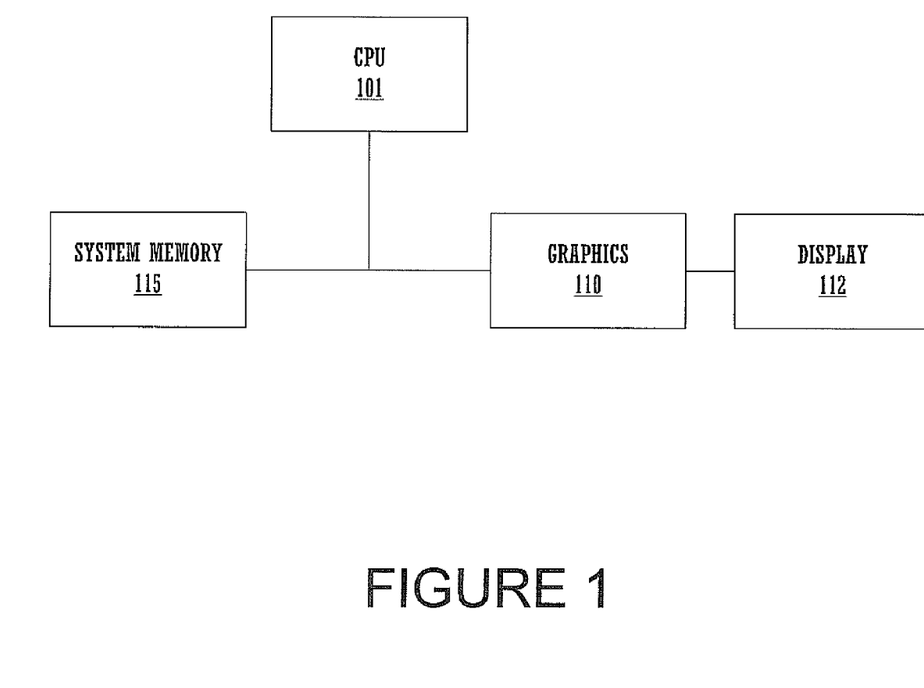
FIG. 1 shows a computer system platform in accordance with one embodiment of the present invention.

With reference now to FIG. 1, a computer system 100 in accordance with one embodiment of the present invention is shown. Computer system 100 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 100) and are executed by the CPU of system 100. When executed, the instructions cause the computer system 100 to implement the functionality of the present invention as described below.

In general, computer system 100 comprises at least one CPU 101 coupled to a system memory 115 and a graphics processor unit (GPU) 110 via one or more busses as shown. The GPU 110 is coupled to a display 112. As shown in FIG. 1, system 100 shows the basic components of a computer system platform that implements the functionality of the present invention. Accordingly, system 100 can be implemented as, for example, a desktop computer system or server computer system, having a powerful general-purpose CPU 101 coupled to a dedicated graphics rendering GPU 110. In such an embodiment, components would be included that are designed to add peripheral buses, specialized graphics memory and system memory, IO devices, and the like. Additionally, it should be appreciated that although the GPU 110 is depicted in FIG. 1 as a discrete component, the GPU 110 can be implemented as a discrete graphics card designed to couple to the computer system via a graphics port (e.g., AGP port, or the like), as a discrete integrated circuit die (e.g., mounted directly on the motherboard), or as an integrated GPU included within the integrated circuit die of a computer system chipset (e.g., integrated within the Northbridge chip). Similarly, system 100 can be implemented as a set-top video game console device such as, for example, the Xbox®, available from Microsoft Corporation of Redmond, Wash.

Embodiments of the Present Invention

Figure 2:
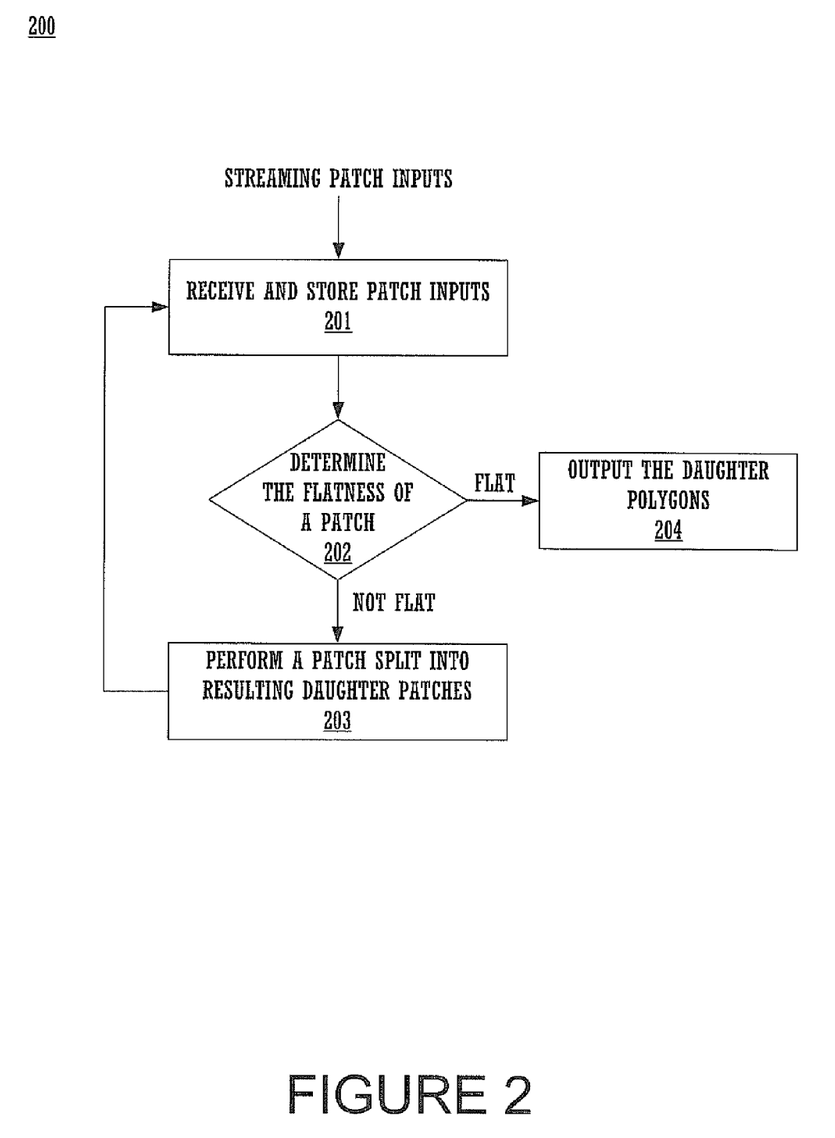
FIG. 2 shows a flowchart of an adaptive tessellation process in accordance with one embodiment of the present invention.

FIG. 2 shows a flowchart of an adaptive tessellation process 200 in accordance with one embodiment of the present invention. As depicted in FIG. 2, process 200 shows the basic steps involved in executing a tessellation process until a given model reaches a desired degree of flatness.

The process 200 embodiment functions in part by performing tessellation until a given input model (e.g., defined by a plurality of parametric surface patches) has been subdivided into a polygon representation having a desired degree of flatness. The input for process 200 is a stream of the parametric surfaces, or parametric patches, that comprise the model. With each patch input, process 200 subdivides the patch input, increasing the number of polygons within the model, to generate a more accurate representation of the modeled surface. As known by those skilled in the art, a given parametric patch, or surface, is mathematically defined by a set of control points. A typical model of an object can comprise hundreds of patches, or more. In the present embodiment, to facilitate processing, the patches are stripped off of the model and are passed in-order (e.g., streamed) to process 200 on a per patch basis. Received patches are converted to an intermediate form to facilitate subdivision processing. In accordance with embodiments of the present invention, the intermediate form can be a Bezier patch form or a B-spline patch form. The received patch input, its control points, and its extraordinary point data (if any) are then stored in a patch buffer or in stack storage until needed.

As known by those skilled in the art, tessellation generally refers to the arrangement of polygons within a checkered, or mosaic, pattern to represent objects having curved or other types of arbitrary topology. More specifically, in the field of computer graphics, tessellation refers to increasing the number of polygons within a given model to more accurately approximate a given surface, usually a curved surface.

The surfaces in a 3-D computer generated image are typically described by data models (e.g., mathematically described polygons and polyhedra) that define the shape of the surface, the object attributes, and the connectivity and positioning data describing how different surfaces fit together. The component polygons and polyhedra of a surface connect at common edges defined in terms of common vertices. The polygons are textured, Z-buffered, and shaded/illustrated onto an array of pixels, creating a realistic 3D image.

More particularly, in order to take advantage of the capabilities of a typical 3-D graphics pipeline, the process 200 embodiment needs to tessellate the patch input into triangle polygons. This is because typical 3-D graphics pipelines are set up to process triangle polygons. However, depending upon the particular requirements of a given application, quadrilateral polygons can also be generated.

Referring still to process 200 of FIG. 2, process 200 begins in step 201, where an individual patch input of the model is accessed for subdivision processing. In the present embodiment, the first step of the tessellation process involves reading a plurality of control points for the patch input. As known by those skilled in the art, a given parametric patch, or surface, is mathematically defined by a set of control points. A typical model of an object can comprise hundreds of patches, or more. In the present embodiment, to facilitate processing, the patches are stripped off of the model and are passed in-order to process 200 on a per patch basis. This arrangement is at times refer to as a streaming mesh definition since the control points and the patches defining the mesh are "streamed" to the subdivision process in order, one or more patches at a time. In step 201, the incoming patch inputs are received, converted to the intermediate form (e.g., Bezier patch form or B-spline patch form) and stored in a patch buffer or stack storage until needed.

In step 202, each polygon of the patch input 210 is tested to determine its degree of flatness. As known by those skilled in the art, flatness refers to the degree to which a faceted, polygon based, representation accurately resembles the subdivision limit surface. In the present embodiment, the degree of flatness is determined by a test computation (e.g., flatness test) performed in step 202. If the patch input passes the flatness test, process 200 proceeds to step 204. Otherwise process 200 proceeds to step 203.

The subdivision limit surface is parametrically defined by the control points of the patch. The vertices of the polygon representation of the patch are computed points on the subdivision limit surface. The flatness test generally measures the difference between polygons connecting the vertices and the subdivision limit surface. As the polygon representation of the patch becomes more piecewise accurate (e.g., increasing number of polygons) the difference between the polygons connecting the vertices and the subdivision limit surface becomes increasingly smaller. A flatness test in accordance with one embodiment of the present invention is further described below in FIG. 4.

In step 203, if any edges of a patch do not pass the flatness test, that patch is split into two or four daughter patches. Process 200 of the present embodiment determines the placement of the vertices and edges of the daughter patches. In so doing, the process 200 algorithm utilizes information from the parent patch to determine the values of the daughter patches. If the parent patch has any extraordinary points at its corners, the algorithm also uses the extraordinary point information (e.g., in the extraordinary point buffer) in its determination.

Referring still to step 203 of FIG. 2, the process 200 algorithm places and connects the daughter polygons in 3D space such that the polygon mesh becomes a smoother, less geometrically aliased representation of the real life object being modeled.

In the present embodiment, extraordinary point data for each patch is retained in a buffer for use in calculating the manner of, and the placement of, the daughter polygons in 3-D space. As known by those skilled in the art, extraordinary points result from subdividing surfaces having arbitrary topology. In one embodiment, one to four extraordinary point buffers are used to hold the extraordinary point vertices and the vertices of its adjacent faces. Before a patch with extraordinary points is subdivided, the data in each of the appropriate extraordinary point buffers is modified using standard subdivision rules. The old extra-ordinary point vertex and its neighbors are replaced with their new versions. When the patch is subdivided, the four new control points at the corner of the patch are calculated using the data from the appropriate extraordinary point buffer if that corner corresponds to an extraordinary point. If not, the new control points are calculated using standard patch splitting math. For B-spline patches the control points are copied from the extraordinary point buffer. For Bezier patches the control points are calculated using the same technique that was used to create the original Bezier patch.

Process 200 places the resulting daughter polygons back into stack storage at step 201 (e.g., after the polygon has been subdivided in step 203). This allows the daughter polygons to be tested in step 202 for flatness and the split again if necessary in step 203. In this manner, non flat polygons are continually split until they pass the flatness test in step 202. Hence, the tessellated surfaces operated on by process 200 approach the surface's smooth limit with repeated subdivisions. Once all four sides of a patch are flat, the daughter polygon(s) are output as shown (e.g., two triangles or a single quadrilateral) in step 204.

Thus, the process 200 embodiment of the present invention implements adaptive tessellation, wherein polygons of a patch input are continually split until they have the necessary degree of flatness. Additionally, the process 200 embodiment is adaptive in that a given model, as opposed to being tessellated ahead-of-time, is tessellated just-in-time, for example, tessellated just as a rendering process is preparing to render the curved surface. Depending upon the specific requirements of a given application, the degree of required flatness can be adjusted. For example, to produce a smoother representation, a high degree of flatness can be required, where daughter polygons are recursively tessellated, leading to a correspondingly large number of polygons in the resulting representation. To conserve computer resources (e.g., memory and CPU cycles), a lesser degree flatness can be required which leads to a resulting representation having a fewer number polygons and requiring less computer resources to compute and handle. Additionally, the adaptive tessellation is implemented in an interactive manner with respect to a user. For example, a graphic designer can interactively adjust the flatness threshold depending upon the rendered result of the model. If the rendered result is not as expected, the graphic designer can interactively lower the flatness threshold, thereby implementing a greater degree of recursive tessellation in the areas having particularly problematic topography. This increases the accuracy of the tessellation until the desired result is obtained. Another example would be a case where a real-time application in accordance with one embodiment of the present invention adjusts the flatness threshold for each frame to maintain a consistent frame rate as the amount of geometry being rendered changes.

Figure 3:
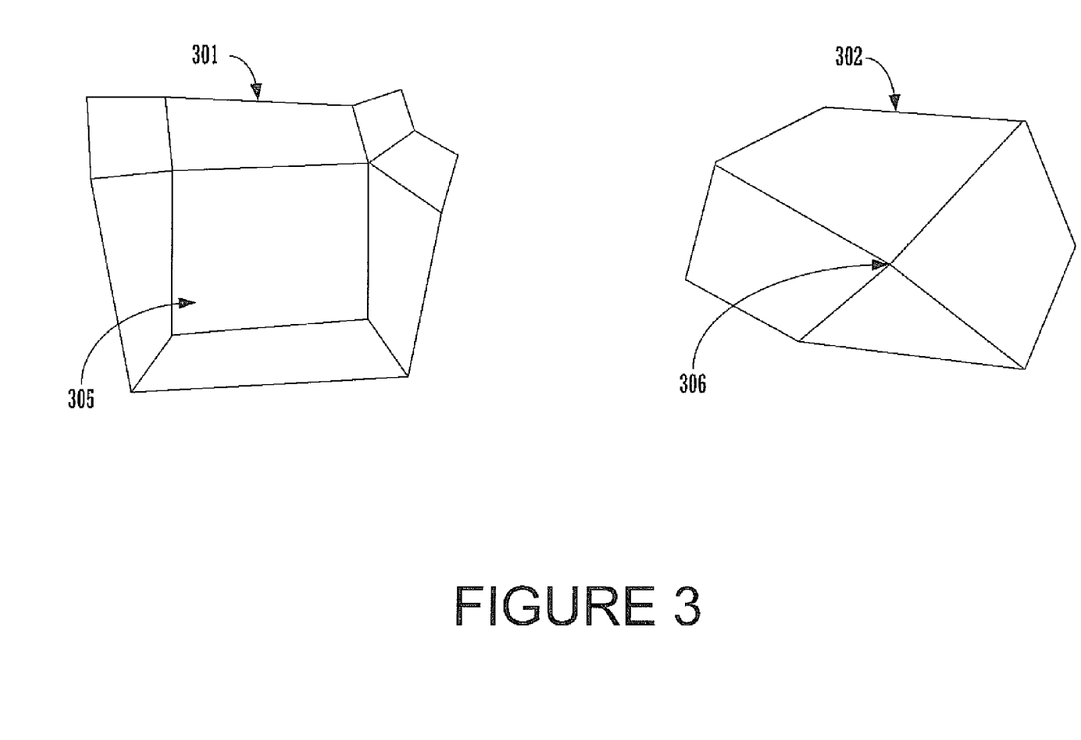
FIG. 3 shows two types of subdivision surfaces in accordance with one embodiment of the present invention.

FIG. 3 shows two types of subdivision surfaces 301-302 in accordance with one embodiment of the present invention. As depicted in FIG. 3, the subdivision surface 301 is an example of a Catmull-Clark subdivision surface. The subdivision surface 302 is an example of a Doo-Sabin subdivision surface. As known by those skilled in the art, and as shown in FIG. 3, a Catmull Clark subdivision surface is centered on a central face 305, while a Doo-Sabin subdivision surface is centered on a central vertex 306. In both cases, process 200 functions by creating a streaming format in order to access to polygon mesh of a given model. As described above, to facilitate processing, the patches are stripped off of the model and are streamed (e.g., passed in-order) to process 200 on a per patch basis. In the process 200 embodiment, indices for each control point for each patch 301 or 302 are also accessed.

Other types of subdivision surfaces in addition to Catmull-Clark and Doo-Sabin can be used with embodiments of the present invention. Examples include, different "loop" type surfaces and/or "modified butterfly" type surfaces. These types of subdivision surfaces share a common attribute in that they are triangle based schemes as opposed to quadrilateral based schemes.

Figure 4:
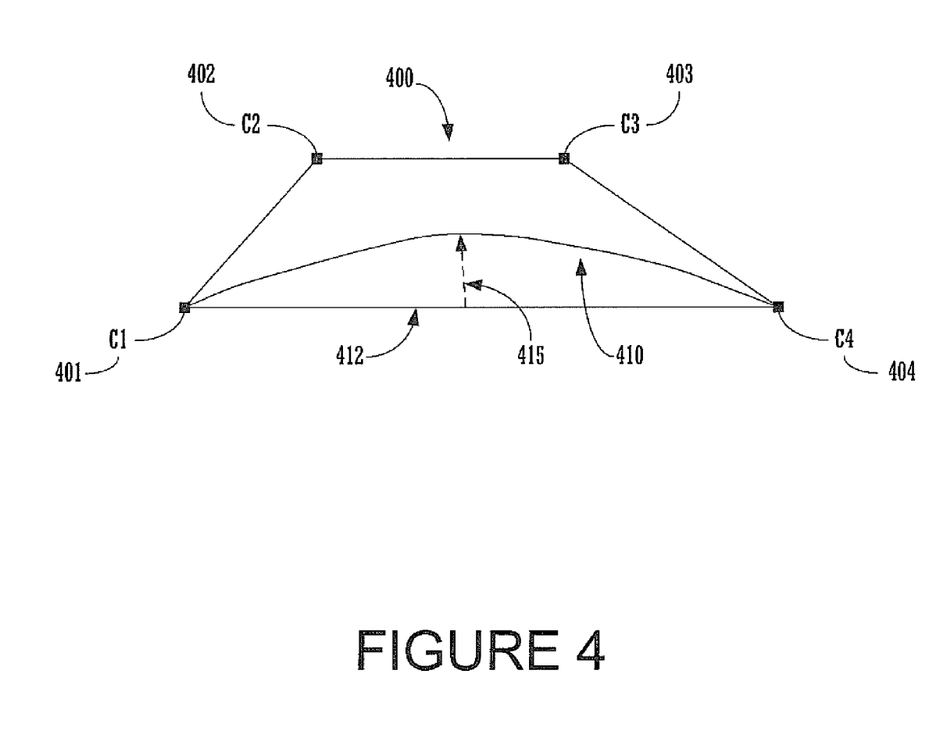
FIG. 4 shows a diagram of a flatness test for edges of adjacent polygons in accordance with one embodiment of the present invention.

FIG. 4 shows a diagram of a flatness test in accordance with one embodiment of the present invention. As depicted in FIG. 4, an edge 412 of a polygon is shown with respect to four control points 401-404 and a limit curve 410.

In the present embodiment, flatness is measured with respect to a distance at the midpoint of an edge 412 and the midpoint of the limit curve 410. The limit curve 410 is the curve that is mathematically defined by the control points. The vertices, which in this case correspond to control point 401 and control point 404, are points on the limit curve 410. The distance between the midpoint of the limit curve and the midpoint of the edge 412 is shown in FIG. 4 as line 415. Thus, the edge 412 is considered flat when the distance 415 is below a predetermined threshold. If the distance 415 is above the threshold, the edge 412 is not considered flat, and the thus fails a flatness test. With each subdivision, the distance 415 will shrink smaller and smaller, as the daughter edges approach the limit curve 410. The flat distance can be specified in screen coordinate space to allow for view dependent tessellation. Geometry closer to the viewer can be tessellated more than geometry further from the viewer, leading to fewer output polygons and better tessellation performance.

Figure 5:
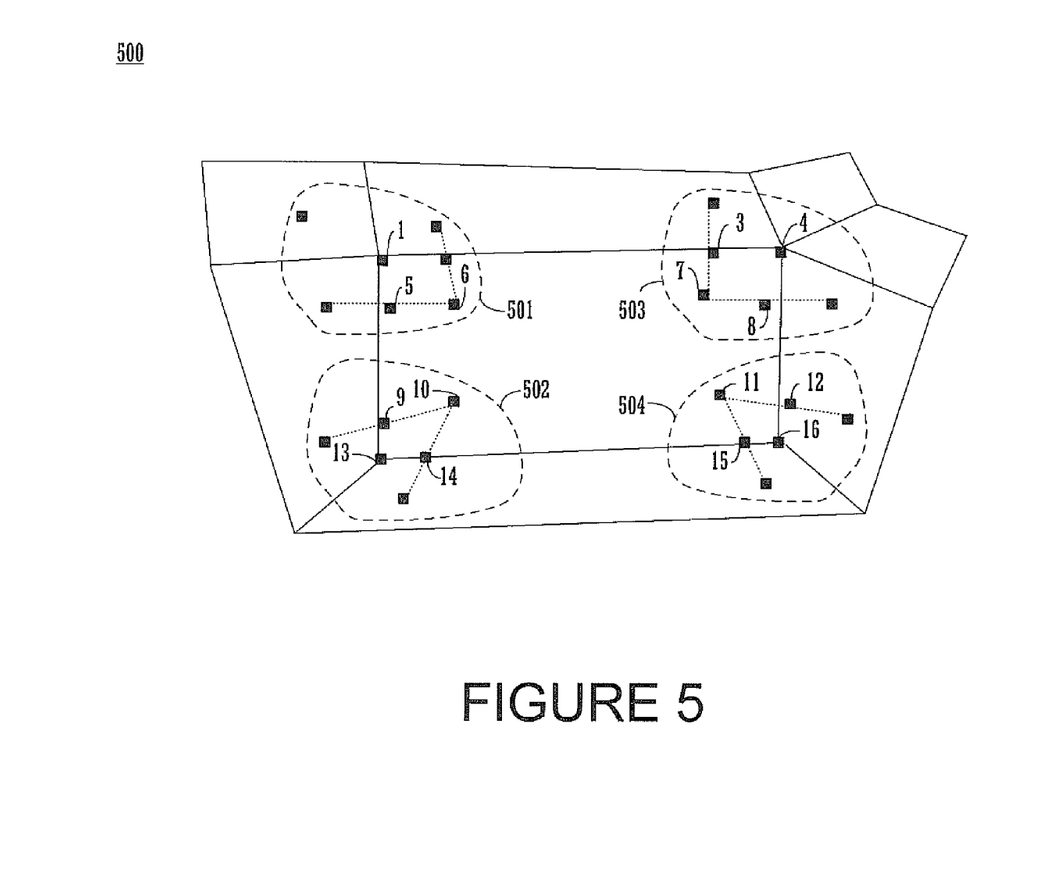
FIG. 5 shows a diagram depicting a conversion of a Catmull-Clark patch to a Bezier patch of a model of a surface in accordance with one embodiment of the present invention.

FIG. 5 shows a diagram depicting a conversion of a Catmull-Clark patch 500 to a Bezier patch in accordance with one embodiment of the present invention. After accessing a model of a surface for subdivision processing, the model is converted to an intermediate form to facilitate subdivision processing. In the present embodiment, the intermediate form is a Bezier patch form. FIG. 5 shows a case where a Catmull-Clark patch 500 is converted to the Bezier patch intermediate form.

FIG. 5 shows the derivation of Bezier control points from the original Catmull-Clark control points. The conversion from Catmull-Clark to Bezier involves the calculation of inner control points (4*face midpoint+2*edge midpoints+vertex)/9. The outer control points are the averages of the face's inner control points and the inner control points of adjoining faces, as shown by control point groups 501-504. The resulting 16 Bezier control points are numbered as shown in FIG. 5, with control points 1, 2, 5, and 6 in group 501, control points 9, 10, 13, and 14 in group 502, control points 3, 4, 7, and 8 in group 503, and control points 11, 12, 15, and 16 in group 504.

It should be noted that patch 500 can be converted to a B-spline patch intermediate form as an alternative to a Bezier patch intermediate form. Depending upon the specific requirements of a given application, the Bezier patch form can be more efficient to work with due to the fact that calculating points on the surface and tangents to the surface is more computationally efficient than the B-spline patch form. It should be noted, however, that there are some circumstances where the B-spline patch form provides certain advantages. For example, some graphics rendering applications require neighboring normals of a patch to have the exact same value, such as where volume data must be created for stencil volume shadows. In order for the shadows to render correctly, the normals of the tessellated surface need to be exactly the same. Another example would be displacement mapping, where exact normals are required in order to implement displacement mapping of the subdivision surface. If the normals are not exact, watertight tessellation can be compromised since the normals are scaled by the displacement and then added to output vertices.

It can be very difficult to guarantee that adjacent Bezier patch normals are calculated exactly the same because the floating point math used in the calculations has limited accuracy and the tangents used to calculate the normal are calculated using different control points. With B-spline patches the tangents of a patch are calculated using the same control points, therefore, as long as the calculation order is carefully observed, the resulting normals will be exactly the same. In contrast, to obtain normals that are exactly the same for a Bezier patch, an extra mechanism needs to be provided to share the normals. Such a mechanism can be designed to execute efficiently, however, it may prove difficult to implement in hardware.

Figure 6:
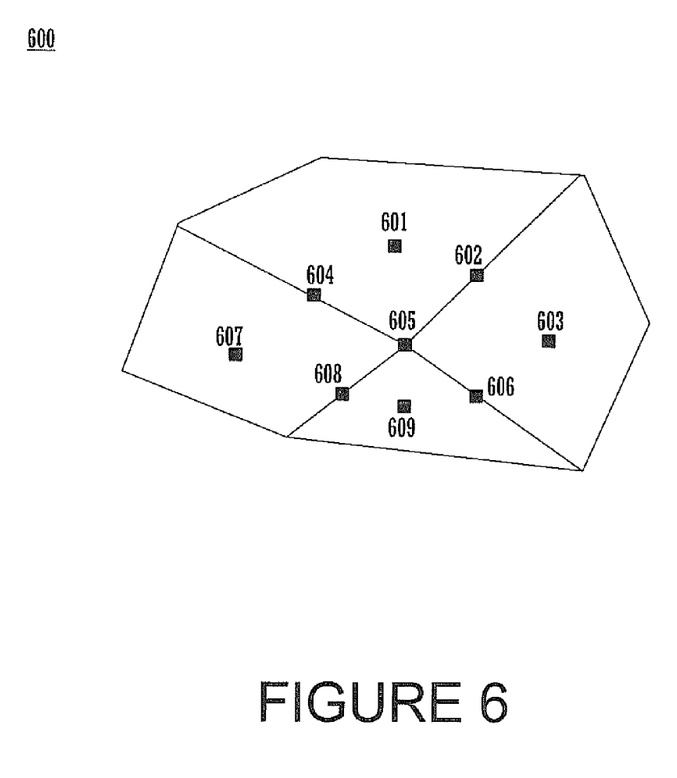
FIG. 6 shows a diagram depicting a conversion of a Doo-Sabin patch to a Bezier patch in accordance with one embodiment of the present invention.

FIG. 6 shows a diagram depicting a conversion of a Doo-Sabin patch 600 to a Bezier patch in accordance with one embodiment of the present invention. This embodiment shows the intermediate form being a Bezier patch, where a Doo-Sabin patch 600 is converted to the Bezier patch intermediate form.

In the present embodiment, as depicted in FIG. 6, the conversion from Doo-Sabin to Bezier involves the calculation wherein the center vertex 605 becomes a control point 605, the midpoints of the edges become control points 602, 604, 606, and 608, and the midpoints of the faces become the control points 601, 603, 607, and 609.

It should be noted that Catmull-Clark and Doo-Sabin subdivision surfaces as used by embodiments of the present invention are a compact, easy-to-model representation of curved surfaces of arbitrary topology. Embodiments of the present invention convert each face, for Catmull-Clark, or vertex, for Doo-Sabin, of the subdivision surface control mesh to a modified Bezier patch then tessellates the patch to quads. This avoids the problems with prior art subdivision methods with respect to occurred subdivision methods being very inefficient in terms of space and time. This also avoids the problems with respect to other subdivision methods, wherein surfaces based on Bezier patches can be very efficient to render, but difficult to model with directly, are very space inefficient to represent, and cannot be used to smoothly render arbitrary topologies. Embodiments of the present invention are fully capable of rendering surfaces having arbitrary topologies.

In one embodiment of the present invention, subdivision surfaces are tessellated using DeCalstlejau subdivision. The DeCalstlejau algorithm is efficient in both space and time, keeping the model in the compact subdivision surface form but using the patch form for fast tessellation. The DeCalstlejau algorithm used by embodiments of the present invention can be modified if necessary to handle the extraordinary points that are the result of arbitrary topology.

Figure 7:
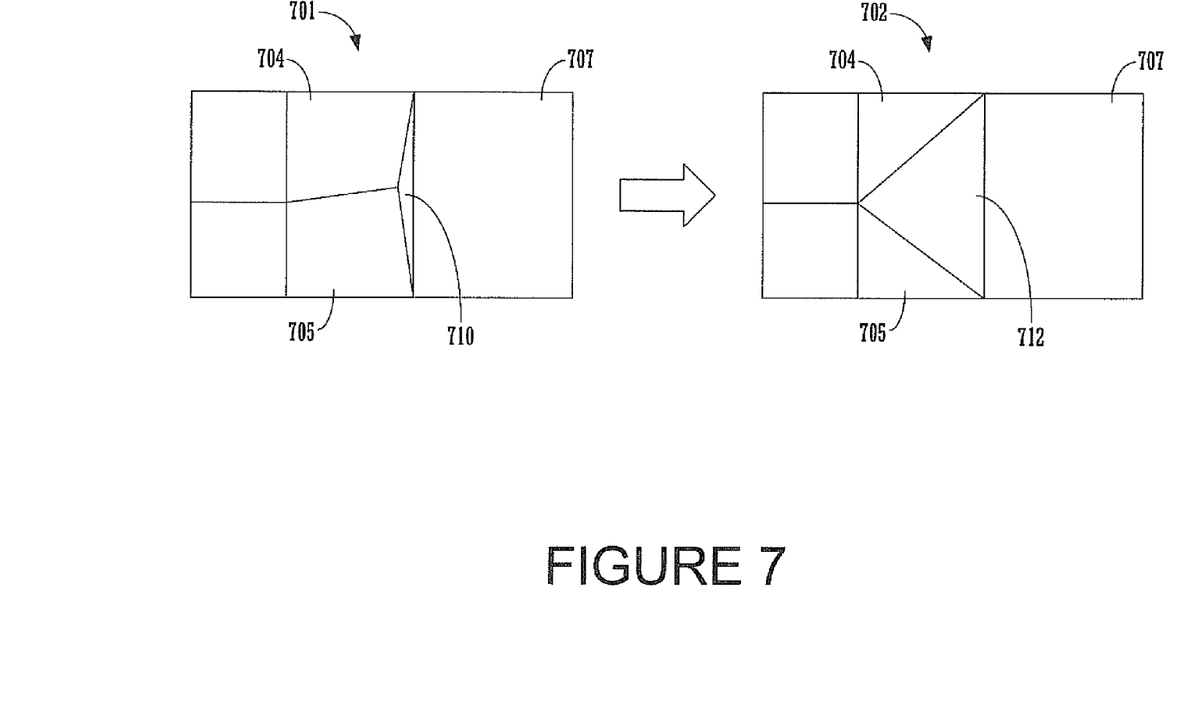
FIG. 7 shows a diagram showing a first surface having a crack discontinuity and a second surface having an inserted triangle that closes the discontinuity in accordance with one embodiment of the present invention.

FIG. 7 shows a diagram showing a first surface 701 having a gap 710 and a second surface 702 having an inserted triangle 712 in accordance with one embodiment of the present invention.

As known by those skilled in the art, problems can occur when adjacent patches are tessellated to different levels. For example, if an edge is measured to be flat, it can be rendered with two vertices only. This can lead to gaps between adjacent edges, as shown by the gap 710 between edges 701 and 705 and 707. Embodiments of the present invention solve this problem by adding a triangle to the mesh for each edge measured to be flat if the patch is split. The vertex that is not on the flat edge is moved as far away from the edge as possible to avoid shading artifacts and overlapping geometry. The triangle is emitted after the daughter patches have been tessellated so the tessellation depth can be used to make sure that the vertex is placed close enough to the edge to avoid overlapping any of the daughter patches' polygons.

Thus, embodiments of the present invention provide a method and system for performing adaptive tessellation on a subdivision surface. Embodiments of the present invention provide a solution that efficiently implements surface subdivision in a polygon mesh. Embodiments of the present invention are able to accurately subdivide a curved surface having an arbitrary topology using a minimum amount of memory. Additionally, embodiments of the present invention are able to efficiently compute a subdivision surface without imposing extreme computational hardware requirements on a computer system platform.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for performing adaptive tessellation on a subdivision surface and rendering the surface on a display, comprising:

accessing a model of a surface for subdivision processing;

dividing the model of said surface into a plurality of patches comprising a first patch, wherein said first patch comprises extraordinary point data;

storing control points associated with said plurality of patches in a buffer for processing on a per patch basis;

determining whether to subdivide said first patch;

modifying said extraordinary point data of said first patch based on subdivision rules if it is determined that said first patch is to be subdivided;

converting the first patch to an intermediate form to facilitate subdivision processing; and adaptively tessellating the intermediate form of the model using a DeCasteljau subdivision process, wherein said adaptive tessellation occurs as a rendering process is preparing to render said surface wherein a flatness threshold is adjusted for said tessellating of said intermediate form of said model depending upon the rendered result of the model.

2. The method of claim 1, wherein the intermediate form is a Bezier patch form or a B-spline patch form configured to facilitate subdivision processing.

3. The method of claim 1, further comprising:
tessellating the intermediate form of the model into a plurality of quadrilateral polygons.

4. The method of claim 1, further comprising:
tessellating the intermediate form of the model into a plurality of triangle polygons.

5. The method of claim 1, wherein the first patch is converted from a Catmull-Clark model to the intermediate form.

6. The method of claim 1, wherein the first patch is converted from a Doo-Sabin model to the intermediate form.

7. The method of claim 6 wherein the surface has an arbitrary topology.

8. The method of claim 7, further comprising:
processing a plurality of extraordinary points of the surface using a modified DeCasteljau subdivision process configured to handle the extraordinary points.

9. The method of claim 1 further comprising:
determining whether a patch in the intermediate form is within a desired degree of flatness; and
subdividing the patch in the intermediate form if it cannot be represented as single flat polygon to a specified accuracy.

10. A non-transitory medium having computer readable code which executed by a computer system causes the computer system to implement a method for performing adaptive tessellation on a subdivision surface, comprising:
accessing a model of a surface for subdivision processing;
dividing the model of said surface into a plurality of patches comprising a first patch, wherein said first patch comprises extraordinary point data;
storing control points associated with said plurality of patches in a buffer for processing on a per patch basis;
determining whether to subdivide said first patch;
modifying said extraordinary point data of said first patch based on subdivision rules if it is determined that said first patch is to be subdivided;
converting the first patch to an intermediate form to facilitate subdivision processing; and
iteratively tessellating the intermediate form of the model using a DeCasteljau subdivision process until a predetermined degree of flatness is achieved wherein a flatness threshold is adjusted for said tessellating of said intermediate form of said model depending upon the rendered result of the model, and wherein said predetermined degree of flatness is interactively adjustable by a user, wherein said iteratively tessellating occurs as a rendering process is preparing to render said surface.

11. The non-transitory medium of claim 10, wherein the intermediate form is a Bezier patch form or a B-spline patch form configured to facilitate subdivision processing.

12. The non-transitory medium of claim 10, further comprising:
tessellating the intermediate form of the model into a plurality of quadrilateral polygons.

13. The non-transitory medium of claim 10, further comprising:
tessellating the intermediate form of the model into a plurality of triangle polygons.

14. The non-transitory medium of claim 10, wherein the first patch is converted from a Catmull-Clark model to the intermediate form.

15. The non-transitory medium of claim 10, wherein the first patch is converted from a Doo-Sabin model to the intermediate form.

16. The non-transitory medium of claim 15, wherein the surface has an arbitrary topology.

17. The non-transitory medium of claim 16, further comprising:
processing a plurality of extraordinary points of the surface using a modified DeCasteljau subdivision process configured to handle the extraordinary points.

18. The non-transitory medium of claim 10 further comprising:
determining whether a polygon of the intermediate form is within said desired degree of flatness; and
tessellating the polygon if the polygon if the polygon is not within a desired degree of flatness test.

19. A computer system having a processor, a bus, a memory, and a graphics rendering pipeline for displaying 3D graphics on a display, the memory having computer readable code which when executed by the computer system causes the computer system to implement a method for performing adaptive tessellation, wherein the computer system:
accesses a model of a surface for subdivision processing;
divides the model of said surface into a plurality of patches comprising a first patch, wherein said first patch comprises extraordinary point data;
stores control points associated with said plurality of patches in a buffer for processing on a per patch basis;
determines whether to subdivide said first patch;
modifies said extraordinary point data of said first patch based on subdivision rules if it is determined that said first patch is to be subdivided;
converts the first patch to an intermediate form to facilitate subdivision processing;
tessellates the intermediate form of the model using a DeCasteljau subdivision process, wherein said tessellation occurs as a rendering process is preparing to render said surface;
determines whether a patch in the intermediate form is within a desired degree of flatness;
subdivides the patch in the intermediate form if it cannot be represented as a single flat polygon to the desired accuracy; and
outputs the polygon to the graphics rendering pipeline for rendering if the patch in the intermediate form is within a desired degree of flatness wherein a flatness threshold is adjusted for said intermediate form depending upon the rendered result of the model.

20. The system of claim 19, further comprising:
recursively tessellating a plurality of daughter patches resulting from an earlier tessellation if the daughter patches are not within the desired degree of flatness.

21. The system of claim 20 wherein the recursive tessellation of the daughter patches is implemented in an interactive manner with a user.

22. The system of claim 19, wherein the intermediate form is a Bezier patch form configured to facilitate subdivision processing.

23. The system of claim 19, wherein the intermediate form is a B-spline patch form configured to facilitate subdivision processing.

24. The system of claim 19, wherein the first patch is converted from a Catmull-Clark model to the intermediate form.

25. The system of claim 19, wherein the model is converted from a Doo-Sabin model to the intermediate form.

26. The system of claim 19 further comprising:
tessellating the intermediate form of the model while guaranteeing the creation of a gap in the model is prevented.

27. The system of claim 26 further comprising:
filling the gap in the model by inserting polygon into the gap.

28. The system of claim 27, wherein the surface has an arbitrary topology.

29. The system of claim 28, further comprising:
processing a plurality of extraordinary points of the surface using a modified DeCasteljau subdivision process configured to handle the extraordinary points.

30. A method for performing adaptive tessellation on a subdivision surface and rendering the surface on a display, comprising:
receiving a model of a surface for subdivision processing;
dividing the model of said surface into a plurality of patches comprising a first patch, wherein said first patch comprises extraordinary point data;
storing control points associated with said plurality of patches in a buffer for processing on a per patch basis;
determining whether to subdivide said first patch;
modifying said extraordinary point data of said first patch based on subdivision rules if it is determined that said first patch is to be subdivided;
converting the first patch to an intermediate form to facilitate subdivision processing;
tessellating the intermediate form of the model using a DeCasteljau subdivision process, wherein geometry closer to a viewer is tessellated more in comparison to geometry further to said viewer, wherein said tessellating occurs as a rendering process is preparing to render said surface;
determining whether a patch in the intermediate form is within a desired degree of flatness; and
subdividing the patch in the intermediate form into a plurality of daughter patches when said flatness is not within said desired degree of flatness wherein a flatness threshold is adjusted for said intermediate form depending upon the rendered result of the model.

31. A method as described in claim 30, wherein said desired flatness is interactively adjustable by a user.

32. A method as described in claim 30, wherein said first patch is a Catmull-Clark model.

33. A method as described in claim 30, wherein said first patch is a Doo-Sabin model.

34. A method as described in claim 30, wherein said plurality of daughter patches is smoother in comparison to said first patch.

* * * * *